US012578182B2

(12) United States Patent
Sonobe et al.

(10) Patent No.: US 12,578,182 B2
(45) Date of Patent: Mar. 17, 2026

(54) IMAGE MEASUREMENT SYSTEM, IMAGE MEASUREMENT METHOD, AND PROGRAM

(71) Applicant: MITUTOYO CORPORATION, Kanagawa (JP)

(72) Inventors: Hirato Sonobe, Miyazaki (JP); Takeshi Saeki, Tokyo (JP); Yukimasa Nishio, Kanagawa (JP); Ryohei Kanno, Kanagawa (JP); Takahiro Ito, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 230 days.

(21) Appl. No.: 18/494,046

(22) Filed: Oct. 25, 2023

(65) Prior Publication Data

US 2024/0142221 A1    May 2, 2024

(30) Foreign Application Priority Data

Oct. 28, 2022    (JP) ................................. 2022-172864

(51) Int. Cl.
G01B 11/03         (2006.01)

(52) U.S. Cl.
CPC .................................... G01B 11/03 (2013.01)

(58) Field of Classification Search
CPC ........ G01B 11/03; H04N 23/56; H04N 23/54; A61B 6/4435; A61B 6/4441
See application file for complete search history.

(56) References Cited

U.S. PATENT DOCUMENTS

| | | | |
|---|---|---|---|
| 2004/0109205 A1* | 6/2004 | Asano | G01B 11/306 |
| | | | 358/448 |
| 2005/0109959 A1* | 5/2005 | Wasserman | H04N 23/56 |
| | | | 250/559.19 |
| 2006/0274330 A1 | 12/2006 | Matsumiya et al. | |
| 2013/0021487 A1* | 1/2013 | Ishino | H04N 23/64 |
| | | | 348/220.1 |
| 2015/0185464 A1* | 7/2015 | Karube | H04N 13/275 |
| | | | 348/44 |
| 2016/0012603 A1* | 1/2016 | Unten | G06T 7/593 |
| | | | 382/154 |
| 2018/0136447 A1* | 5/2018 | Ando | H04N 23/54 |
| 2021/0372762 A1* | 12/2021 | Yamaji | G01B 5/02 |
| 2022/0071581 A1* | 3/2022 | Yamamoto | A61B 6/4435 |

FOREIGN PATENT DOCUMENTS

JP        2006-337274 A     12/2006

* cited by examiner

*Primary Examiner* — Sang H Nguyen
(74) *Attorney, Agent, or Firm* — Rankin, Hill & Clark LLP

(57)        ABSTRACT

Provided is an image measurement system including: a placement portion on which a measurement object is placed; an imaging unit configured to be relatively movable with respect to the placement portion; a movement control unit that switches between a high-speed movement mode and a low-speed movement mode and allows the imaging unit to relatively move with respect to the placement portion; and an imaging control unit that captures instantaneous image information by the imaging unit on the basis of switching to the low-speed movement mode.

19 Claims, 6 Drawing Sheets

IMAGE MEASUREMENT SYSTEM, IMAGE MEASUREMENT METHOD, AND PROGRAM

CROSS REFERENCE TO RELATED APPLICATIONS

This application claims the benefit of Japanese Priority Patent Application JP 2022-172864 filed Oct. 28, 2022, the entire contents of which are incorporated herein by reference.

BACKGROUND

The present invention relates to an image measurement system, an image measurement method, and a program.

In an image measurement system disclosed in Japanese Patent Application Laid-open No. 2006-337274 (hereinafter, referred to as Patent Literature 1), either a measurement accuracy prioritized mode or a measurement speed prioritized mode can be selected for measuring a work.

On the measurement accuracy prioritized mode, a tolerable measurement accuracy or a tolerable amount of movement (amount of shake) at the time of capturing images is input. A movement speed is calculated on the basis of the input measurement accuracy or amount of movement and non-stop measurement operation is executed at a speed lower than the calculated movement speed.

On the measurement speed prioritized mode, a movement speed is input. Non-stop measurement operation is executed at the input movement speed. This allows efficient image measurement according to measurement desired by a user.

SUMMARY

It is desirable to improve measurement throughput while keeping measurement accuracy in the image measurement system disclosed in Patent Literature 1 and the like.

In view of the above-mentioned circumstances, it is an objective of the present invention to provide an image measurement system, an image measurement method, and a program that can improve measurement throughput while keeping measurement accuracy.

In order to accomplish the above-mentioned objective, an image measurement system according to an embodiment of the present invention includes a placement portion, an imaging unit, a movement control unit, and an imaging control unit.

A measurement object is placed on the placement portion.

The imaging unit is configured to be relatively movable with respect to the placement portion.

The movement control unit switches between a high-speed movement mode and a low-speed movement mode and allows the imaging unit to relatively move with respect to the placement portion.

The imaging control unit captures instantaneous image information by the imaging unit on the basis of switching to the low-speed movement mode.

In the image measurement system, it is possible to switch between the high-speed movement mode and the low-speed movement mode and relatively move the imaging unit with respect to the placement portion. Moreover, the imaging unit captures the instantaneous image information by on the basis of switching to the low-speed movement mode. This configuration allows improvement in measurement throughput while keeping measurement accuracy.

The image measurement system may further include an illumination unit capable of irradiating the measurement object with strobe light. In this case, the imaging control unit may execute stroboscopic imaging on the measurement object so as to capture the instantaneous image information.

The movement control unit may switch to the low-speed movement mode from the high-speed movement mode by decreasing a relative speed and switches to the high-speed movement mode from the low-speed movement mode by increasing the relative speed.

The movement control unit may relatively move the imaging unit with respect to the placement portion so that a relative position of the imaging unit with respect to the placement portion becomes a predetermined imaging position after switching to the low-speed movement mode. In this case, the imaging control unit may capture the instantaneous image information at the same time as the relative position of the imaging unit with respect to the placement portion becomes the predetermined imaging position.

The movement control unit is capable of relatively stopping the imaging unit with respect to the placement portion at the predetermined imaging position. In this case, the imaging control unit may capture the instantaneous image information at the same time as the imaging unit is relatively stopped with respect to the placement portion.

The image measurement system may further include a determination unit that determines whether or not the imaging unit is relatively stationary with respect to the placement portion at the predetermined imaging position. In this case, the imaging control unit may capture the instantaneous image information in a case where the determination unit determines that the imaging unit is relatively stationary with respect to the placement portion.

The determination unit may determine whether or not the imaging unit is relatively stationary with respect to the placement portion on the basis of a change in the relative position of the imaging unit with respect to the placement portion in a predetermined determination time duration. In this case, the predetermined determination time duration may be set on the basis of a capturing time duration at a time of capturing the instantaneous image information.

The movement control unit may switch to the high-speed movement mode after capturing the instantaneous image information.

The imaging control unit may capture the instantaneous image information multiple times.

The imaging control unit may control a shutter speed of the imaging unit so as to capture the instantaneous image information.

An image measurement method according to an embodiment of the present invention includes switching between a high-speed movement mode and a low-speed movement mode and relatively moving an imaging unit with respect to a placement portion on which a measurement object is placed.

The imaging unit captures instantaneous image information on the basis of switching to the low-speed movement mode.

A program according to an embodiment of the present invention causes a computer system to execute the following steps.

A step of switching between a high-speed movement mode and a low-speed movement mode and relatively moving an imaging unit with respect to a placement portion on which a measurement object is placed.

A step of capturing instantaneous image information by the imaging unit on the basis of switching to the low-speed movement mode.

As described above, in accordance with the present invention, it is possible to improve measurement throughput while keeping measurement accuracy. It should be noted that the effects described here are not necessarily limitative and any effect described in the present disclosure may be provided.

DETAILED DESCRIPTION OF EMBODIMENTS

Hereinafter, an embodiment according to the present invention will be described with reference to the drawings. [Configuration of Image Measurement System]

Figure 1:
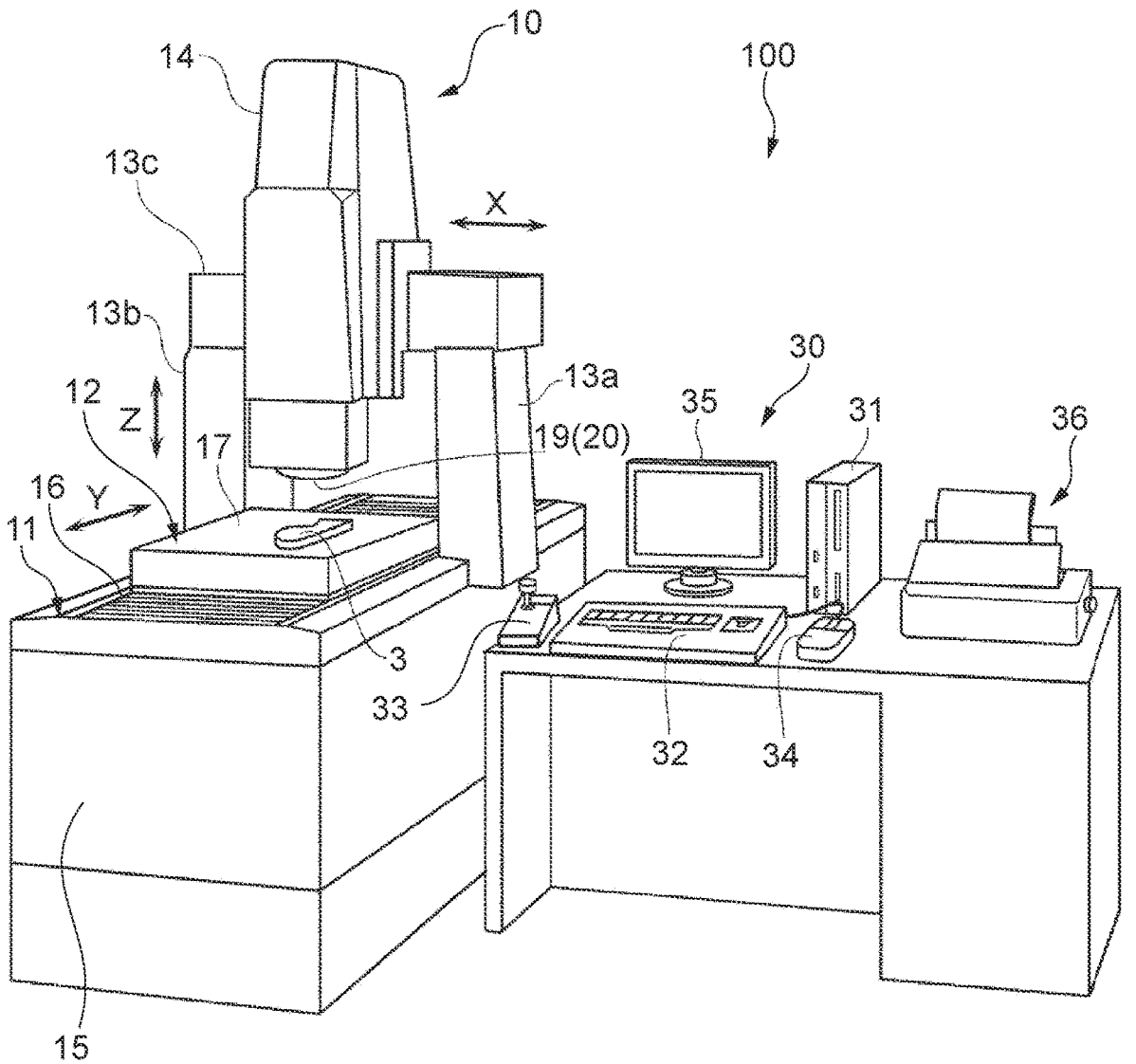
FIG. 1 is a schematic view showing a configuration example of an image measurement system according to an embodiment of the present invention.

FIG. 1 is a schematic view showing a configuration example of an image measurement system according to an embodiment of the present invention.

An image measurement system 100 includes a non-contact image measuring machine 10 and a personal computer (PC) 30. The PC 30 controls driving of the image measuring machine 10 and executes required data processing.

The PC 30 functions as an embodiment of an information processing apparatus according to the present invention. It should be noted that a computer other than the PC may be used.

The image measuring machine 10 includes a table 11, a stage 12, and an imaging unit 14. The table 11 is a sample-moving means. The stage 12 is placed on the table 11. The imaging unit 14 is disposed above the stage 12.

The table 11 includes a base 15. The base 15 has a main surface 16. The main surface 16 has a first direction (X-axis direction) as a shorter-side direction and a second direction (Y-axis direction) orthogonal to the first direction as a longitudinal direction.

Two supporting portions 13*a* and 13*b* extending upwards (Z-axis direction) are mounted on two longer-side portions of the base 15. A guide portion 13*c* extending in the X-axis direction is mounted between the two supporting portions 13*a* and 13*b*.

The stage 12 has a placement surface 17 on which a work 3 as a measurement object is placed. The stage 12 is placed on the main surface 16 of the table 11 so that the placement surface 17 is parallel to a horizontal direction.

In the present embodiment, the stage 12 (placement surface 17) functions as a placement portion on which a measurement object is placed.

The main surface 16 of the table 11 includes a Y-axis drive mechanism (not shown) that allows the stage 12 to move in the Y-axis direction. Moreover, the Y-axis drive mechanism has a Y-axis scale (not shown) that detects a position (Y-coordinate value) of the stage 12 in the Y-axis direction.

The PC 30 controls the Y-axis drive mechanism so that the stage 12 moves in the Y-axis direction. Then, the Y-axis scale detects a Y-coordinate value in real time.

Specific configurations of the Y-axis drive mechanism and the Y-axis scale are not limited, and may be arbitrarily designed.

The imaging unit 14 is attached to the guide portion 13*c* mounted between the two supporting portions 13*a* and 13*b*.

The guide portion 13*c* includes an X-axis drive mechanism (not shown) that allows the imaging unit 14 to move in the X-axis direction. Moreover, the X-axis drive mechanism has an X-axis scale (not shown) that detects a position (X-coordinate value) of the imaging unit 14 in the X-axis direction.

The PC 30 controls the X-axis drive mechanism so that the imaging unit 14 moves in the X-axis direction. Then, the X-axis scale detects a X-coordinate value in real time.

Specific configurations of the X-axis drive mechanism and the X-axis scale are not limited, and may be arbitrarily designed.

The imaging unit 14 includes a camera 19 facing the stage 12.

The camera 19 includes an optical system and an image sensor (both not shown). The image sensor picks up an image of the measurement object formed by the optical system.

Examples of the optical system include a telecentric optical system with a large focal depth.

Examples of the image sensor include a complementary metal-oxide semiconductor (CMOS) sensor and a charge coupled device (CCD) sensor.

An imaging operation by the camera 19 allows capturing of image information of the work 3. In the present embodiment, the imaging by the camera 19 corresponds to capturing of image information by the camera 19.

In the present embodiment, the camera 19 functions as an imaging unit.

Moreover, the imaging unit 14 includes an illumination device 20. The illumination device 20 is capable of irradiating the work 3 with illumination light. In the present embodiment, the illumination device 20 is mounted in vicinity of the camera 19 (in FIG. 1, the reference sign of the illumination device 20 is depicted at the same position as the camera 19). As a matter of course, the present invention is not limited to such a configuration.

In the present embodiment, the mounted illumination device 20 is capable of irradiating the work 3 with strobe light. That is, the illumination device 20 is capable of performing strobe lighting (strobe illumination).

A specific configuration of the illumination device 20 is not limited. For example, a ring light with a light-emitting element such as a light-emitting diode (LED) is used. Alternatively, a lamp light source such as a xenon lamp may be used.

In the present embodiment, the illumination device 20 functions as an illumination unit.

The imaging unit 14 includes a Z-axis drive mechanism (not shown) that allows the camera 19 to move in the Z-axis direction. Moreover, the Z-axis drive mechanism has a Z-axis scale (not shown) that detects a position (Z-coordinate value) of the camera 19 in the Z-axis direction.

The PC 30 controls the Z-axis drive mechanism so that the camera 19 moves in the Z-axis direction. This moves a focal position of the camera 19. The Z-axis scale detects a Z-coordinate value of the camera 19 in real time.

The type of image measuring machine 10 is not limited.

Any apparatus may be used as long as it can execute measurement, observation, and the like by using an object image generated by imaging the work 3. For example, an image probe such as a CNC image measuring machine and a CNC three-dimensional measurement apparatus, a hardness testing machine, or the like can be employed.

In the example shown in FIG. 1, the imaging unit 14 is moved in the X-axis direction and the stage 12 is moved in the Y-axis direction. Moreover, the camera 19 is moved in the Z-axis direction. This enables the camera 19 to relatively move with respect to the placement surface 17 of the stage 12 in XYZ three-dimensional directions.

A configuration for relatively moving the camera 19 with respect to the stage 12 is not limited. For example, a configuration in which the stage 12 is fixed and the camera 19 is movable in the three-dimensional directions or a configuration in which the camera 19 is fixed ad the stage 12 is movable in the three-dimensional directions may be employed. As a matter of course, both the camera 19 and the stage 12 may be configured to be movable in the XYZ three-dimensional directions.

The PC 30 includes a PC body 31, a keyboard 32, a joystick box (hereinafter, referred to as J/S) 33, a mouse 34, a display 35, and a printer 36.

A variety of instructions can be input by operating the keyboard 32, the J/S 33, and the mouse 34.

The display 35 functions as a display unit. The display 35 is a display device using liquid-crystal, electro-luminescence (EL), or a cathode ray tube (CRT), for example.

The printer 36 is capable of printing out a measurement result, for example.

Figure 2:
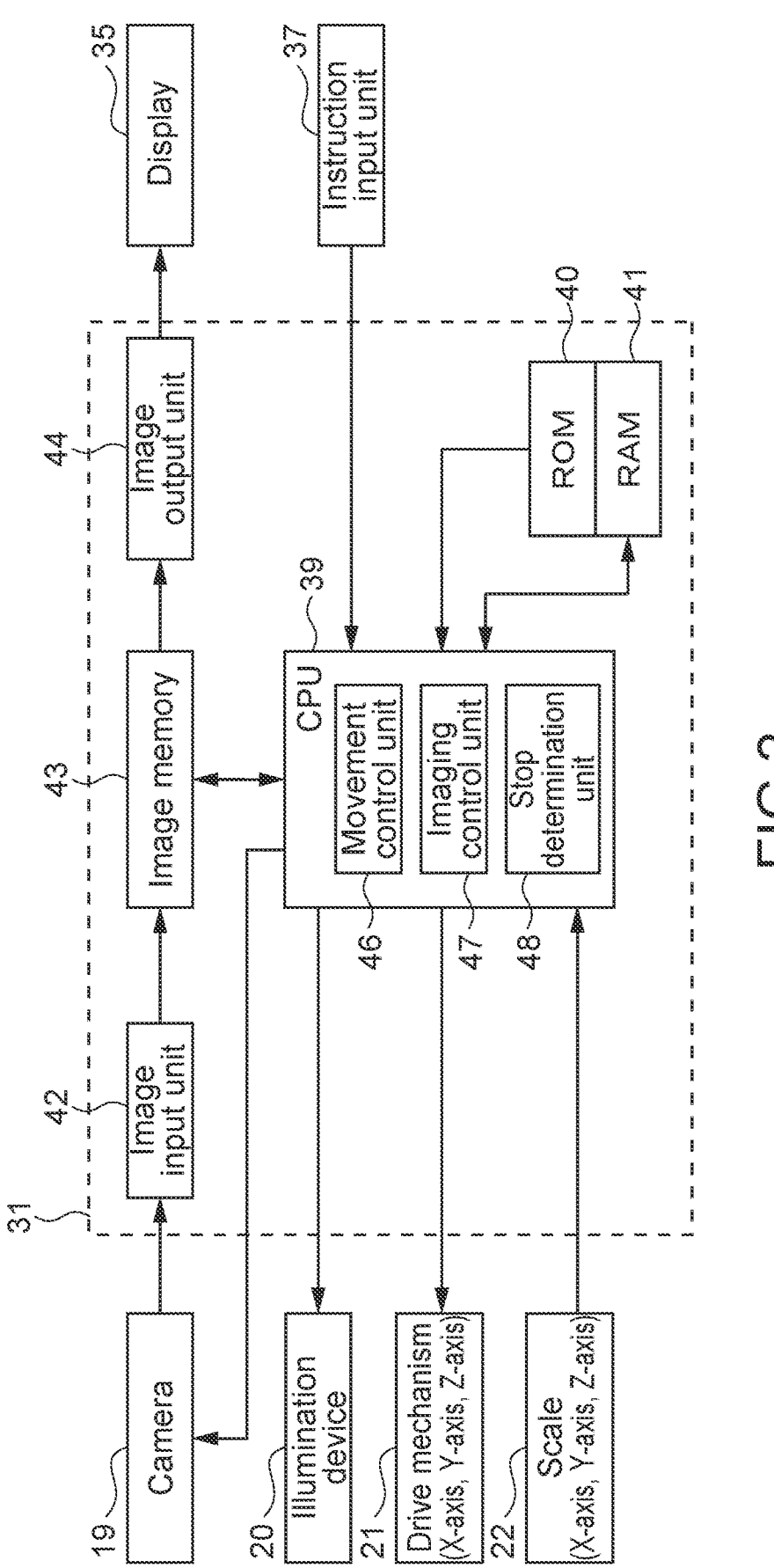
FIG. 2 is a schematic view showing a functional configuration example of a PC body.

FIG. 2 is a schematic diagram showing a functional configuration example of the PC body 31.

It should be noted that FIG. 2 shows the X-axis drive mechanism, the Y-axis drive mechanism, and the Z-axis drive mechanism collectively as a drive mechanism 21. FIG. 2 also shows the X-axis scale, the Y-axis scale, and the Z-axis scale collectively as a scale 22.

An instruction input unit 37 shown in FIG. 2 is a block in which a user's instruction is input. The keyboard 32, the J/S 33, and the mouse 34 shown in FIG. 1 constitute the instruction input unit 37. The illustration of the printer 36 shown in FIG. 1 is omitted.

As shown in FIG. 2, the PC body 31 has hardware configurations required for a computer, such as a central processing unit (CPU) 39, a read only memory (ROM) 40, and a random access memory (RAM) 41.

For example, the CPU 39 loads a program according to the present technology in advance recorded on the ROM 40 or the like to the RAM 41 and executes it for executing an image measurement method according to the present technology (information processing method). Any other hardware such as FPGA and ASIC may be used in order to configure the PC body 31.

Moreover, the PC body 31 includes an image input unit 42, an image memory 43, and an image output unit 44.

The image input unit 42 is an interface for inputting image data. Image data (image information) of the work 3 output from the camera 19 for example is input to the image input unit 42.

The image memory 43 stores image data input to the image input unit 42. Moreover, the image memory 43 stores processed display image data. Examples of the image memory 43 include a hard disk drive (HDD) and a solid state drive (SSD).

The image output unit 44 is an interface for outputting image data. The image output unit 44 outputs the display image data stored in the image memory 43 to the display 35.

The camera 19, the illumination device 20, the drive mechanism 21, the scale 22, and the instruction input unit 37 are connected to the CPU 39 of the PC body 31 via an input/output interface (not shown).

Examples of the input/output interface include a universal serial bus (USB) terminal. In addition, a dedicated interface or the like for connecting the blocks may be used as necessary.

As shown in FIG. 2, in the present embodiment, the CPU 39 executes the program according to the present technology for configuring a movement control unit 46, an imaging control unit 47, and a stop determination unit 48 as functional blocks. As a matter of course, dedicated hardware such as an integrated circuit (IC) may be used for realizing the functional blocks.

The program is installed in the PC 30 via a variety of recording media, for example. Alternatively, the program may be installed via the Internet, for example.

The type and the like of recording medium on which the program is recorded are not limited, and any computer-readable recording medium may be used. For example, any computer-readable non-transitory storage medium may be used.

The movement control unit 46 is capable of controlling each XYZ-axis drive mechanism 21 to control a relative movement of the camera 19 with respect to the stage 12.

The movement control unit 46 is capable of relatively moving the camera 19 with respect to the stage 12 for example so that the relative position of the camera 19 with respect to the stage 12 is a predetermined target position. Moreover, the movement control unit 46 is also capable of relatively stopping the camera 19 with respect to the stage 12.

Hereinafter, for the sake of description, the relative movement of the camera 19 with respect to the stage 12 will be simply referred to as a movement of the camera 19. Moreover, the relative position of the camera 19 with respect to the stage 12 will be also simply referred to as a position of the camera 19.

Figure 3:
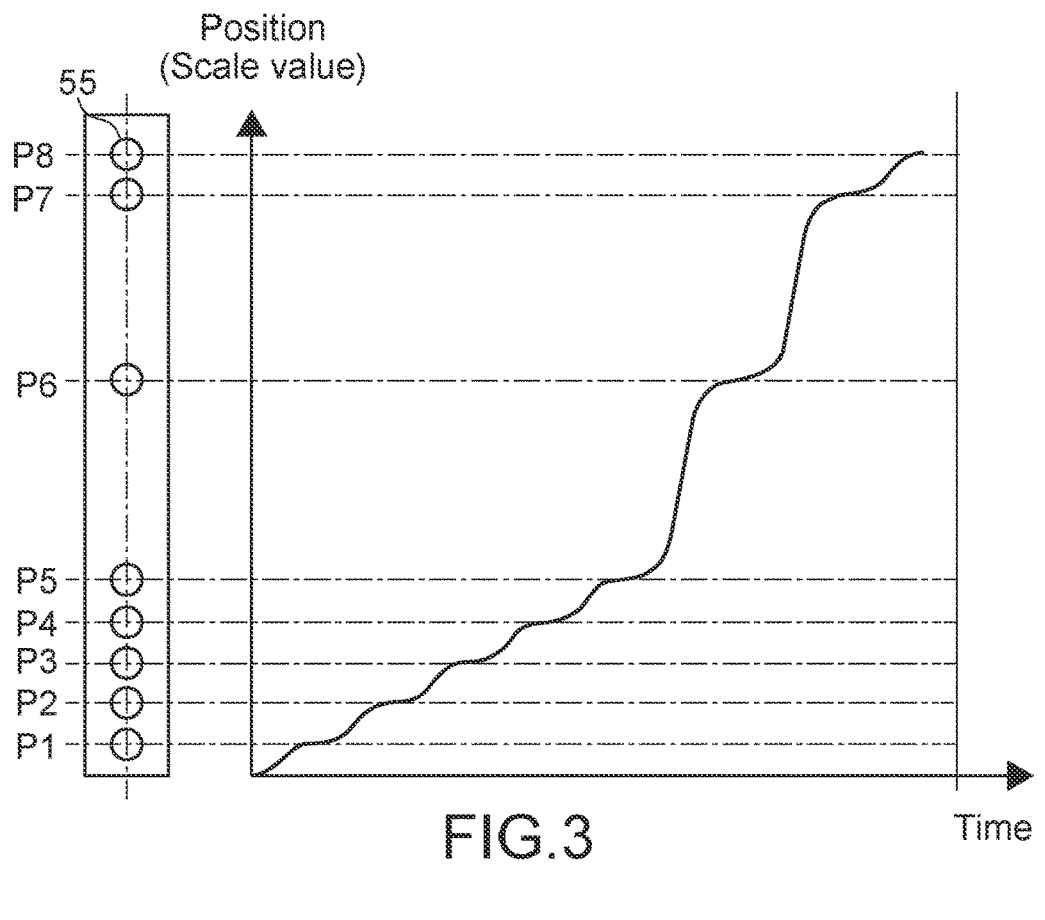
FIG. 3 is a graph schematically showing an example of camera movement control by a movement control unit.
Figure 4:
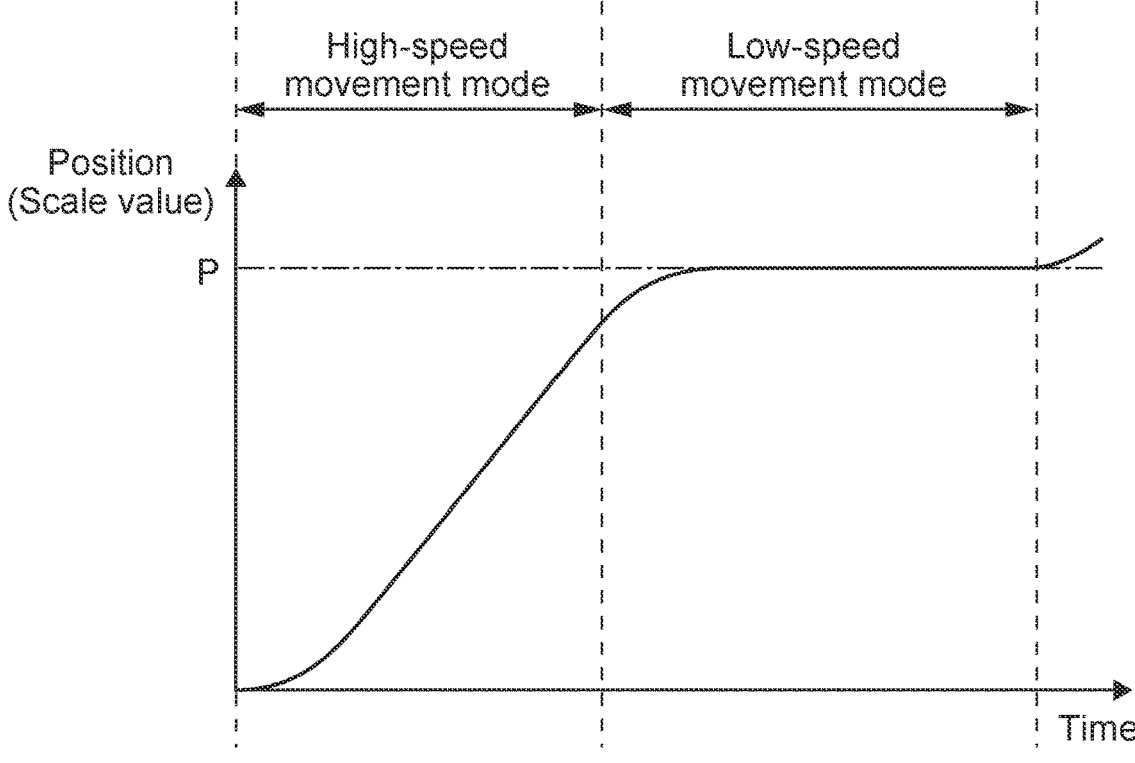
FIG. 4 is a graph schematically showing an example of the camera movement control by the movement control unit.

FIGS. 3 and 4 are graphs each schematically showing an example of the movement of the camera 19 controlled by the movement control unit 46.

The horizontal axis in each graph shown in FIGS. 3 and 4 denotes time and the vertical axis denotes the position of the camera 19. The position of the camera 19 is represented with a coordinate value (scale value) detected by each XYZ-axis scale 22. It should be noted that the scale value in each XYZ axis can be constantly acquired at a predetermined sampling rate.

FIG. 3 shows movement control in a case where eight holes 55 formed in one direction should be measured. For example, the eight holes 55 are arranged in the Y-axis direction.

The movement control unit 46 moves the camera 19 in the Y-axis direction, assuming that the center of the hole 55 are a target position P (P1 to P8). In this example, the movement of the camera 19 is controlled so that the camera 19 stops at the target positions P1 to P8 in order.

FIG. 4 is a graph specifically showing movement control to one of the target positions P.

It should be noted that the target position P corresponds to a predetermined imaging position where the camera 19 performs imaging.

As shown in FIGS. 3 and 4, the movement control unit 46 is capable of switching between a high-speed movement mode and a low-speed movement mode and moving the camera 19. That is, the movement control unit 46 is capable of switching between a high-speed movement mode and a low-speed movement mode and relatively moving the camera 19 with respect to the stage 12.

As shown in FIG. 4, the movement control unit 46 switches to the low-speed movement mode by reducing a relative speed (gradient in the graph) from the high-speed movement mode and switches to the high-speed movement mode by increasing the relative speed (gradient in the graph) from the low-speed movement mode.

Moreover, in this example, the movement control unit 46 moves the camera 19 so that the position of the camera 19 is the target position P after switching to the low-speed movement mode. Moreover, the movement control unit 46 stops the camera 19 at the target position P.

The camera 19 is moved for example on a path between the target positions P on the high-speed movement mode. The camera 19 is moved on a path including the target position P on the low-speed movement mode.

Here, focusing on an average speed in a time duration for which each mode is executed, a movement mode with a higher average speed can be defined as the high-speed movement mode and a movement mode with a lower average speed can be defined as the low-speed movement mode.

For example, a path (predetermined movement range) in a predetermined range including each target position P is set as a first movement range and a path (movement range) between the first movement ranges is set as a second movement range. The camera 19 is moved so that the average speed in the second movement range is higher than the average speed in the first movement range. Such a movement is included in the movement of the camera 19 switching between the "high-speed movement mode" and the "low-speed movement mode" according to the present invention.

Alternatively, the high-speed movement mode and the low-speed movement mode may be defined, focusing on a maximum speed on each mode. That is, a movement mode with a higher maximum speed may be defined as the high-speed movement mode and a movement mode with a lower maximum speed may be defined as the low-speed movement mode.

For example, the camera 19 is moved so that the maximum speed in the second movement range described above is higher than the maximum speed in the first movement range. Also such a movement is included in the movement of the camera 19 switching between the "high-speed movement mode" and the "low-speed movement mode" according to the present invention.

Otherwise, the "high-speed movement mode" and the "low-speed movement mode" may be defined with various parameters related to the speed. It should be noted that each graph shown in FIGS. 3 and 4 is also an example of the movement of the camera 19 switching between the "high-speed movement mode" and the "low-speed movement mode" according to the present invention.

The imaging control unit 47 is capable of controlling the camera 19 and the illumination device 20 to execute imaging by the camera 19, i.e., capture the image information by the camera 19.

In the present embodiment, two imaging modes, a constant imaging mode and a stroboscopic imaging mode, can be executed.

The constant imaging mode is a mode to capture image information at a predetermined frame rate in a state in which the illumination device 20 constantly emits illumination light. The constant imaging mode enables capturing of an observation image (live image), such that the measurement object can be observed in real time.

The stroboscopic imaging mode is a mode to capture image information by the illumination device 20 irradiating a target object with strobe light. Strobic imaging on the measurement object enables capturing of instantaneous image information. An image captured by the stroboscopic imaging is used as a measurement image.

For example, in a case where the constant imaging mode on which image information is captured is switched to the stroboscopic imaging mode, the stroboscopic imaging is executed after the illumination is turned off once. Terminating the stroboscopic imaging enables re-switching to the constant imaging mode. Switching between the constant imaging mode and the stroboscopic imaging mode can be performed in this manner.

Figure 5:
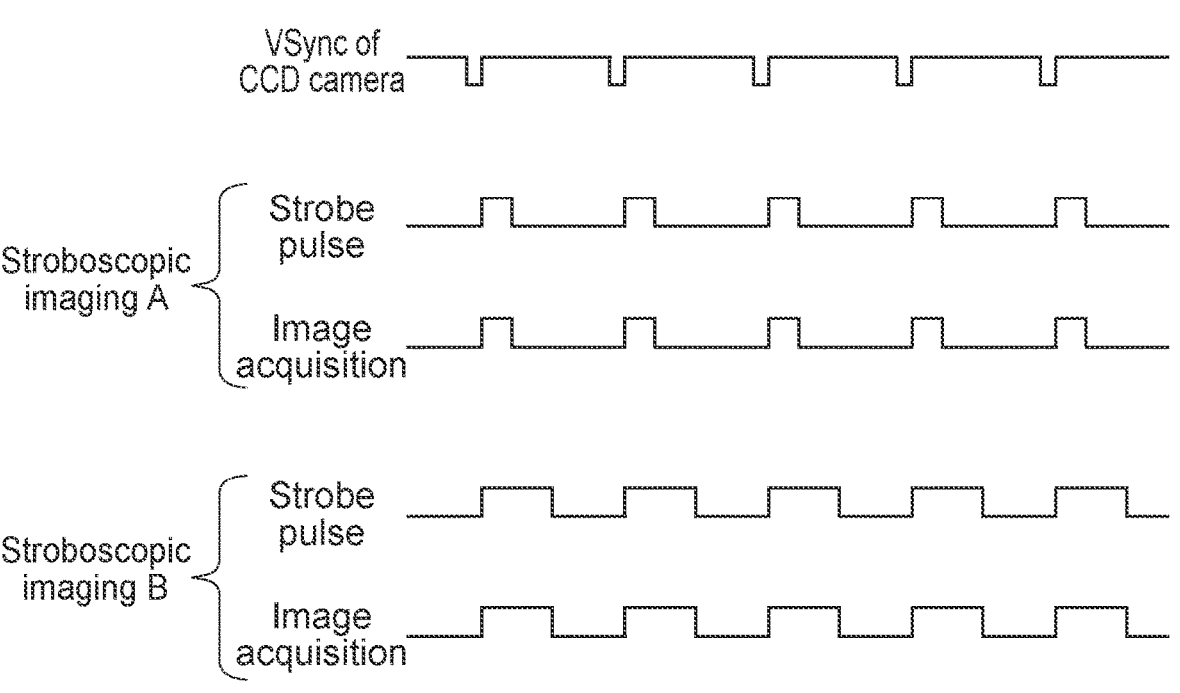
FIG. 5 is a schematic waveform diagram for describing a control example of stroboscopic imaging.

FIG. 5 is a schematic waveform diagram for describing a control example of stroboscopic imaging.

For example, in a case where a CCD camera is used as the camera 19, a strobe pulse is generated in synchronization with a vertical synchronization signal (VSync) of the CCD camera. The strobe pulse corresponds to a lighting pulse duration of strobe illumination. Thus, a time of a pulse duration of the strobe pulse is an irradiation time of strobe light (lighting time of strobe illumination).

As shown in FIG. 5, the pulse duration of the strobe pulse is a time duration for which the image information is captured (hereinafter, referred to as a capturing time duration).

In a case where the pulse duration is small as in stroboscopic imaging A, i.e., in a case where the capturing time duration is small, influences from vibration of the camera 19 (relative vibration with respect to the stage 12) at the time of image acquisition can be reduced while the amount of illumination light at the time of image acquisition lowers.

In a case where the pulse duration is large as in stroboscopic imaging B, i.e., in a case where the capturing time duration is large, the amount of illumination light at the time of image acquisition increases while influences from vibration of the camera 19 (relative vibration with respect to the stage 12) at the time of image acquisition increase.

The pulse duration of the strobe pulse, i.e., the capturing time duration only needs to be set on the basis of a content of measurement, the type of measurement object, and the like so as to obtain a desired measurement accuracy.

It should be noted that a control method for the stroboscopic imaging is not limited, and any other control method may be employed. As a matter of course, the present invention is not limited to the case where the CCD camera is used as the camera 19.

The stop determination unit 48 is capable of determining whether or not the camera 19 is stationary at the target position P. That is, the stop determination unit 48 is capable of determining whether or not the camera 19 is relatively stationary with respect to the stage 12 at the target position P.

A determination time duration which is, for example, a predetermined time duration is set. Then, the stop determination unit 48 is capable of determining whether or not the camera 19 is stationary on the basis of a change in scale value acquired during the determination time duration.

That is, the stop determination unit 48 is capable of determining whether or not the camera 19 is relatively stationary with respect to the stage 12 on the basis of a change in relative position of the camera 19 with respect to the stage 12 during the predetermined determination time duration.

For example, the stop determination unit 48 determines that the camera 19 is stationary in a case where the change in scale value during the determination time duration is within a predetermined range. The stop determination unit 48 determines that the camera 19 is not stationary in a case where the change in scale value is not within the predetermined range. The stop determination unit 48 repeats determination processing until the stop determination unit 48 determines that the camera 19 is stationary after the camera 19 stops at the target position P (after the scale value reaches a target value).

A determination method for determining the stop of the camera 19 is not limited, and any other determination method may be employed.

[Measurement Control by Image Measurement System]

Figure 6:
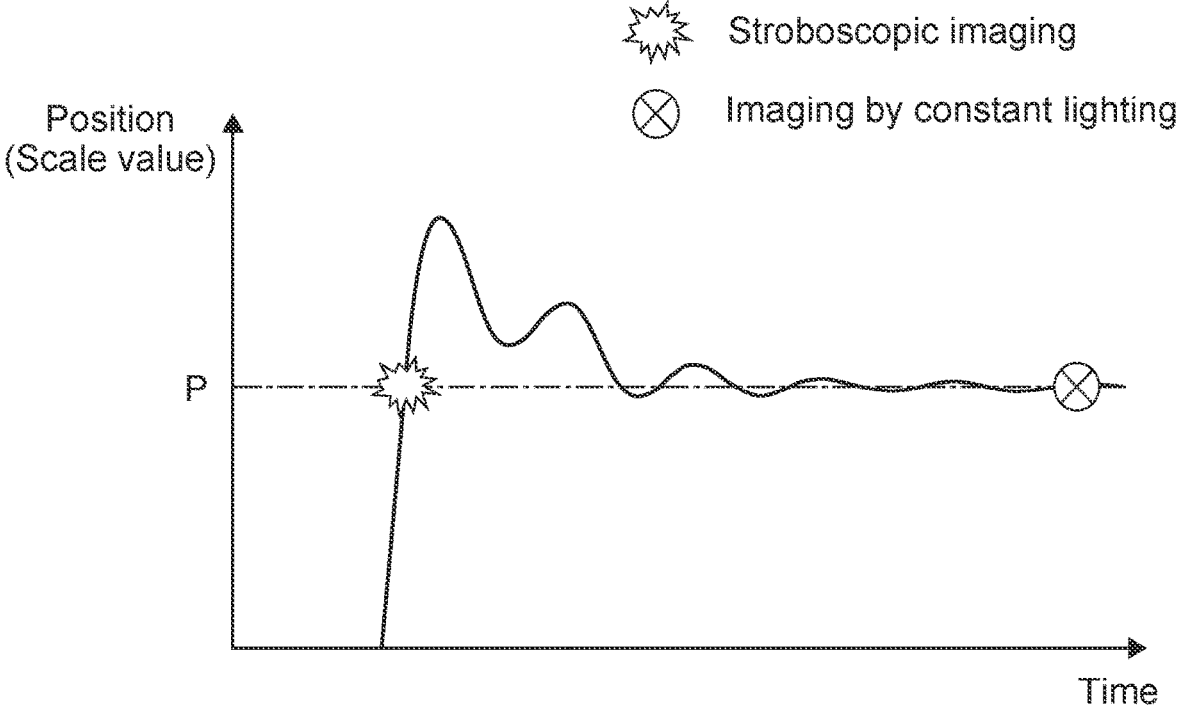
FIG. 6 is a graph for describing an example of measurement control by the image measurement system.

FIG. 6 is a graph for describing an example of measurement control according to the present embodiment.

As shown in FIG. 6, vibration is generated on the camera 19 just after the movement control unit 46 stops the camera 19 at the target position P. A vibration state (scale value change state) depends on, for example, a feedback control algorithm for the scale value and the like, and thus the vibration state is often not a fixed change state.

In order to capture a high-accuracy measurement image at the target position P in a state in which the illumination device 20 constantly emits illumination light as shown in FIG. 6 for example, it is necessary to perform imaging after vibration of the camera 19 converges sufficiently. Thus, measurement throughput lowers by an amount corresponding to a time of waiting for vibration of the camera 19 to converge.

In the image measurement system 100 according to the present embodiment, stroboscopic imaging can be executed on the basis of switching to the low-speed movement mode. That is, the camera 19 can capture the instantaneous image information on the basis of switching to the low-speed movement mode.

Specifically, stroboscopic imaging is executed at the same time as the position of the camera 19 becomes the target position P (as the camera 19 is stopped at the target position P) after switching to the low-speed movement mode as shown in FIG. 6.

That is, in the present embodiment, the imaging control unit 47 captures the instantaneous image information at the same time as the relative position of the camera 19 with respect to the stage 12 becomes the target position P (as the camera 19 is relatively stopped with respect to the stage 12).

Figure 7:
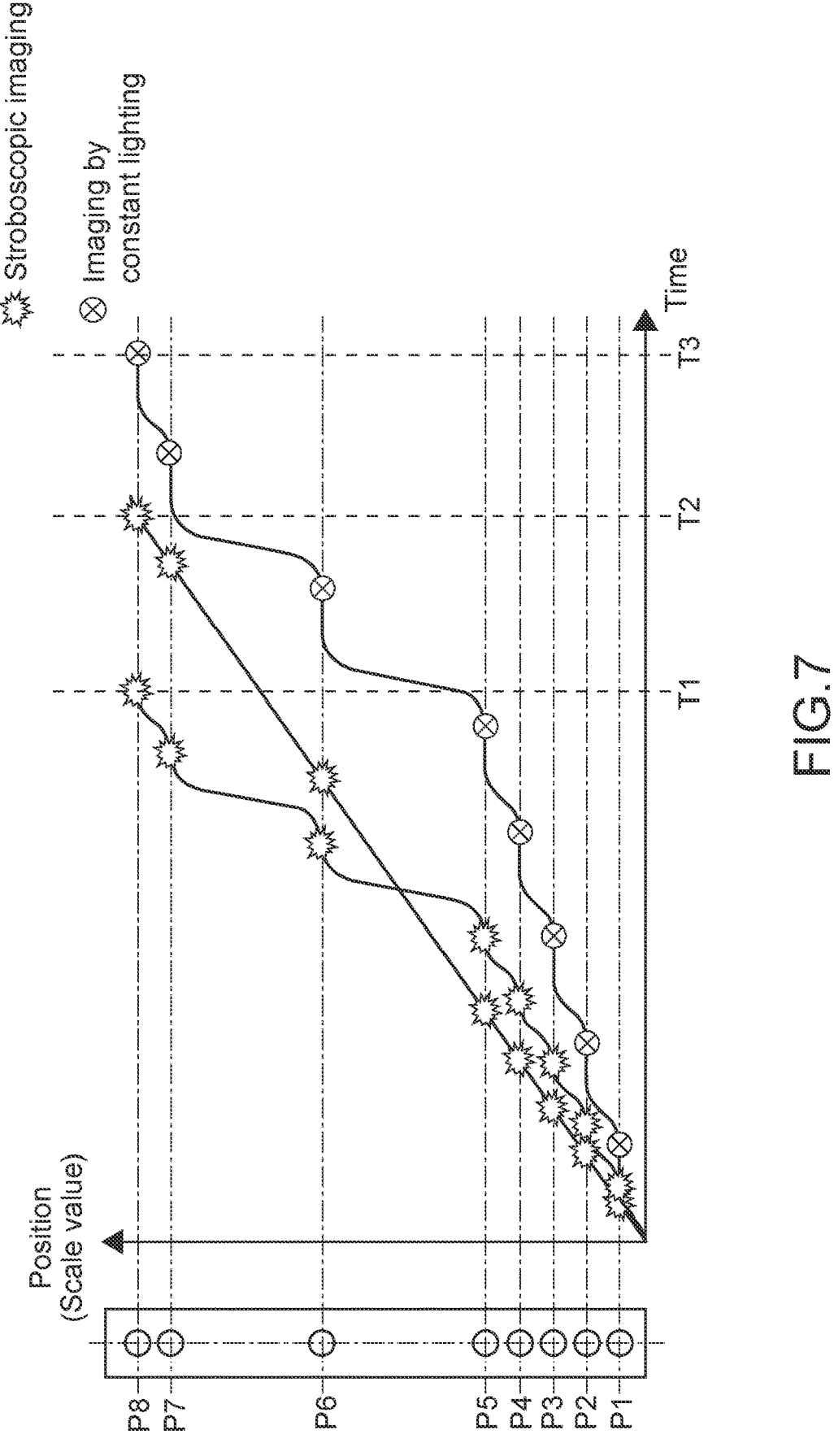
FIG. 7 is a graph for describing an example of the measurement control by the image measurement system.

FIG. 7 is a graph showing an example of measurement control in a case where the eight holes 55 should be measured. FIG. 7 shows constant lighting measurement control and non-stop measurement control together as comparative examples.

In FIG. 7, the graph with the marks of imaging by constant lighting is a graph of the constant lighting measurement control.

In the non-stop measurement control, the camera 19 is moved while keeping the speed constant, and stroboscopic imaging is executed at the target position P (P1 to P8). The straight line graph in FIG. 7 is a graph of the non-stop measurement control.

As it has been also described hereinabove, it is necessary to wait vibration of the camera 19 just after the camera 19 is stopped to converge in the constant lighting measurement control. Therefore, the measurement throughput is low (end timing T3).

In the non-stop measurement control, it is necessary to reduce the movement speed of the camera 19 for keeping a high accuracy of measurement using a measurement image obtained by stroboscopic imaging, and thus the camera 19 should be moved at a low speed during the measurement. Therefore, the measurement throughput lowers (end timing T2). For increasing the speed of the camera 19, the pulse duration (capturing time duration) should be reduced. It lowers the amount of illumination light. The measurement accuracy lowers consequently.

In a control method according to the present embodiment, the high-speed movement mode or the low-speed movement mode can be switched to another and executed. Then, stroboscopic imaging is executed at a time when the position of the camera 19 reaches the target position P (time when the camera 19 is stopped at the target position P) after switching to the low-speed movement mode.

Switching to the high-speed movement mode is performed and the camera 19 is moved after stroboscopic imaging is executed, i.e., after the instantaneous image information is captured.

Accordingly, it is possible to capture a high-quality measurement image with no shake without the need for waiting for the camera 19 to become stationary even in a state in which the camera 19 is shaking just after it is stopped. Since it is unnecessary to wait for the vibration to converge, the measurement time can be reduced (end timing T1).

That is, carrying out the present invention allows improvement in measurement throughput while keeping the measurement accuracy. Moreover, the measurement time can be greatly reduced because stroboscopic imaging is executed at a time when the camera 19 first reaches the target position P.

Moreover, as compared to the non-stop measurement control, the pulse duration (capturing time duration) can be increased and the amount of illumination light can be increased because the camera 19 has been stopped. Accordingly, the measurement accuracy can be improved.

Moreover, since the camera 19 has been stopped after sufficiently lowering the speed as the low-speed movement mode, vibration of the camera 19 just after the camera 19 is stopped can also be reduced. Accordingly, it is possible to increase the pulse duration (capturing time duration) and to increase the amount of illumination light. As a result, the measurement accuracy can be improved.

It should be noted that the measurement control according to the present embodiment can be executed in accordance with a part program generated on the basis of parameters such as the target position P, the speed on the high-speed movement mode, the speed on the low-speed movement mode, and the capturing time duration. For example, various parameters are input via the instruction input unit 37. As a matter of course, the present invention is not limited to such control.

Hereinabove, in the image measurement system 100 according to the present embodiment, the high-speed movement mode or the low-speed movement mode can be switched to another and the camera 19 can be relatively moved with respect to the stage 12. Moreover, the camera 19 captures the instantaneous image information on the basis of switching to the low-speed movement mode. This configuration allows improvement in measurement throughput while keeping the measurement accuracy.

In recent years, the production takt time has been increasingly reduced due to requirements for improvement in the productivity. Therefore, it is desirable to improve the measurement throughput.

A constant illumination method may be envisaged in order to secure a certain amount of illumination light when performing image measurement in a CNC image measuring machine. If imaging is performed just after a stage (or image head) reaches a measurement position in that state, the imaging is performed before vibration associated with driving converges, such that an image with a shake is obtained, which deteriorates the measurement accuracy. In view of this, checking that the stage (or image head) is stabilized is typically performed before the imaging.

Preventing vibration of the camera just after the camera is stopped by, for example, setting a material, an apparatus configuration, and the like to be used for the image measuring machine as appropriate may be also envisaged. In this case, however, the costs associated with the material, design, production, and the like increase, which makes the image measuring machine expensive.

In the image measurement system 100 according to the present embodiment, the measurement throughput can be improved while keeping the measurement accuracy. Therefore, the production takt time can be reduced. Moreover, the costs associated with the design and the like for the image measuring machine do not increase.

OTHER EMBODIMENTS

The present invention is not limited to the above-mentioned embodiment, and various other embodiments can be made.

The stop determination unit 48 may execute the stop determination before stroboscopic imaging, i.e., capturing of the instantaneous image information. That is, the stroboscopic imaging (capturing of the instantaneous image information) may be executed in a case where the stop determination unit 48 has determined that the camera 19 is relatively stationary with respect to the stage 12.

As described above, the determination as to whether or not the camera 19 is stationary can be made on the basis of a change in scale value acquired during the determination time duration.

Figure 8:
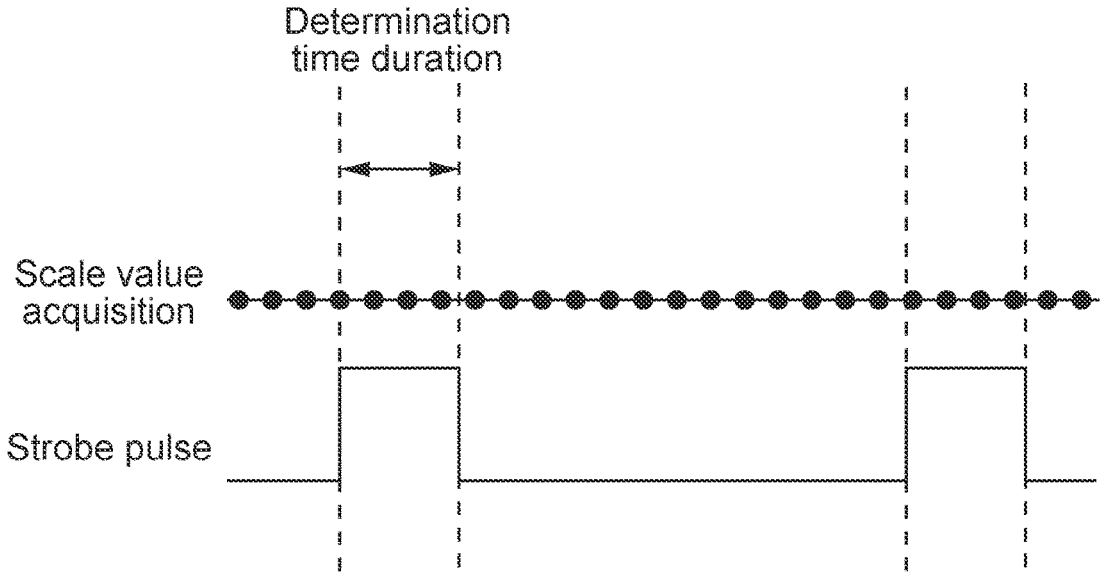
FIG. 8 is a schematic diagram for describing a setting example of a determination time duration.

FIG. 8 is a schematic diagram for describing a setting example of a determination time duration.

As shown in FIG. 8, the determination time duration can be set on the basis of the pulse duration of the strobe pulse (capturing time duration). Since it is sufficient to obtain the state in which it is determined that the camera is stationary during the pulse duration (capturing time duration), the determination time duration can be reduced to substantially equal the pulse duration (capturing time duration), for example. The reduction of the determination time duration can sufficiently reduce the time until it is determined that the camera is stationary.

As a result, the quality of a captured measurement image can be improved while sufficiently suppressing lowering of the measurement throughput associated with the determination. That is, high-accuracy measurement can be achieved while suppressing lowering of the measurement throughput.

It should be noted that FIG. 8 is a diagram showing a relationship between the determination time duration and the pulse duration of the strobe pulse (capturing time duration), and it does not mean that a scale value at the time of stroboscopic imaging is acquired.

For example, the determination time duration is set to equal the pulse duration (capturing time duration). Otherwise, the determination time duration is set to be slightly larger than the pulse duration (capturing time duration). Alternatively, a value of a sampling rate×n (n denotes a positive integer) for obtaining a scale value and a minimum value exceeding the pulse duration (capturing time duration) may be set as the determination time duration. Otherwise, any setting method based on the pulse duration (capturing time duration) may be employed.

In a case where the pulse duration (capturing time duration) is reduced in order to improve the measurement speed, the determination time duration is also reduced. Accordingly, it is advantageous for measurement time reduction.

If the pulse duration (capturing time duration) is increased in order to increase the amount of illumination light, the determination time duration is also increased. This can prevent the occurrence of a shake.

The stroboscopic imaging (capturing of the instantaneous image information) may be executed at target position P multiple times. Then, the measurement image may be selected from a plurality of pieces of image information.

For example, whether or not image information can be used as the observation image is determined every time the image information is obtained. The stroboscopic imaging (capturing of the instantaneous image information) is repeated until it is determined that the obtained image information can be used as the observation image. Such processing may be executed.

Figure 9:
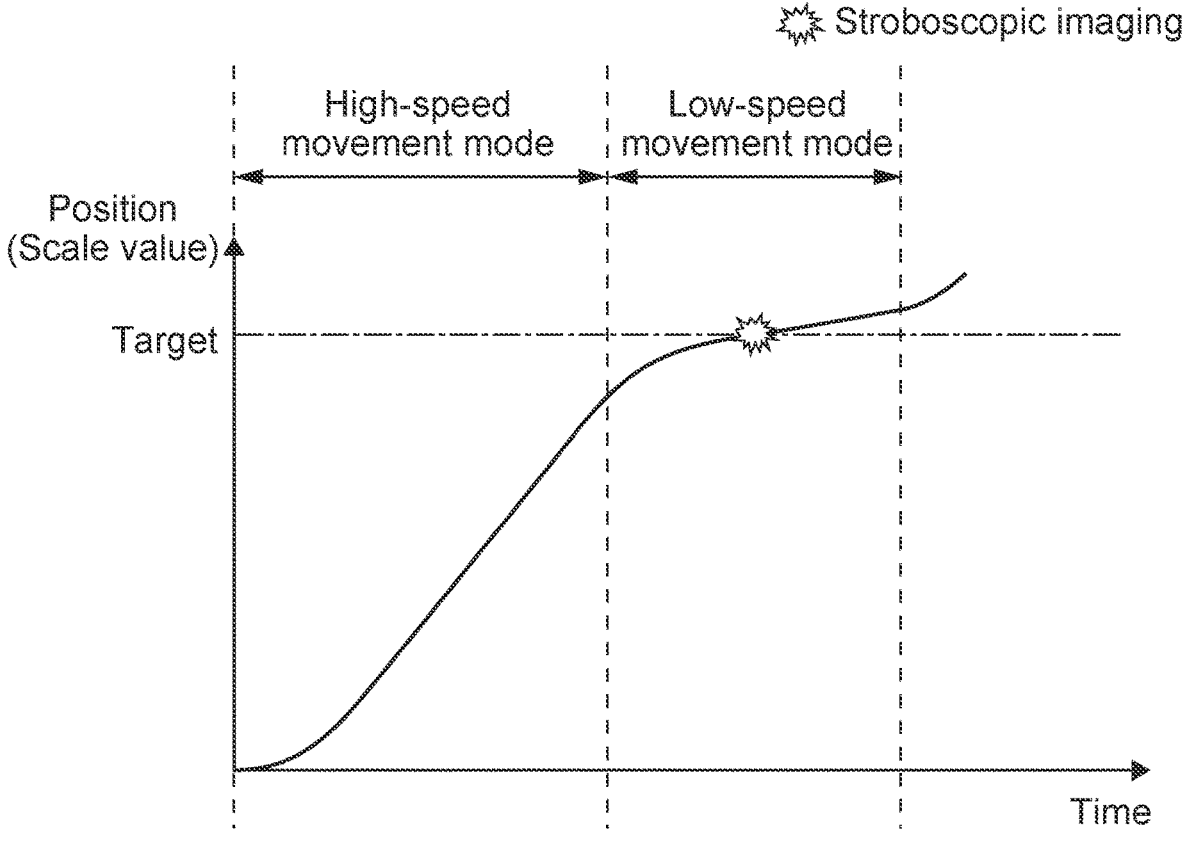
FIG. 9 a graph for describing another example of the measurement control by the image measurement system.

FIG. 9 is a graph schematically showing another example of the measurement control.

As shown in FIG. 9, the stroboscopic imaging (capturing of the instantaneous image information) may be executed at a time when the camera 19 reaches the target position P without stopping the camera 19 at the target position P. That is, the non-stop measurement control may be executed on the basis of switching to the low-speed movement mode.

The non-stop measurement control executed on the low-speed movement mode can suppress the occurrence of a shake. Moreover, the increase in pulse duration (capturing time duration) can increase the amount of illumination light.

Moreover, the switching to the high-speed movement mode which is performed after capturing the image information can improve the measurement throughput.

In the above description, the camera 19 is moved on two modes, the high-speed movement mode and the low-speed movement mode. The present technology is not limited thereto, and three or more movement modes may be switched and executed. In this case, the present invention may be carried out, setting a movement mode when the instantaneous image information is captured as the "low-speed movement mode" and a movement mode higher in speed than the movement mode as the "high-speed movement mode".

The "capturing of the instantaneous image information" is not limited to the stroboscopic imaging.

For example, the shutter speed of the camera 19 (imaging unit) may be controlled for "capturing the instantaneous image information". For example, a CCD camera with a shutter may be employed as the camera 19 and the shutter may be controlled for "capturing the instantaneous image information".

In this case, a shutter opening time duration corresponds to the "capturing time duration".

Otherwise, the present invention may be carried out without limiting configurations and methods for "capturing the instantaneous image information".

A system configuration of the computer for realizing the image measurement system according to the present invention is not limited, and may be arbitrarily designed.

For example, which one of the apparatuses that constitute the image measurement system realizes the "movement control unit", the "imaging control unit", the "determination unit", or the like of the image measurement system according to the present invention is not limited, and can be arbitrarily set. Moreover, those elements may be realized by cooperation of a plurality of apparatuses.

Similarly, a computer system configured by a single computer may execute the image measurement method and the program according to the present invention or a computer system in which a plurality of computers cooperatively operate may execute them. For example, the image measurement method and the program according to the present invention can also be applied to a configuration of cloud computing.

The configurations, the processing flows, and the like of the image measurement system, the image measuring machine, the PC (information processing apparatus), and the like which have been described above with reference to the drawings are merely embodiments, and thus may be arbitrarily modified without departing the gist of the present technology. That is, any other configurations, algorithms, and the like for carrying out the present technology may be employed.

At least two features of the features according to the present invention which have been described above can also be combined. Moreover, the above-mentioned various effects are merely exemplary, not limitative, and any other effects may be provided.

What is claimed is:

1. An image measurement system, comprising:
a stage on which a measurement object is placed;
a camera configured to be relatively movable with respect to the placement portion;
a processor that controls a movement controller and an imaging controller, wherein the processor controls the movement controller and the imaging controller so that:
the movement controller switches between a high-speed movement mode and a low-speed movement mode and allows the camera to relatively move with respect to the stage; and
the imaging controller captures instantaneous image information by the camera, wherein
the movement controller relatively moves the camera with respect to the stage on the low-speed movement mode within a first movement range in which a relative position of the camera with respect to the stage includes a predetermined imaging position and relatively moves the camera with respect to the stage on the high-speed movement mode within a second movement range outside the first movement range, and
imaging controller captures, after the movement controller moves the relative position of the camera with respect to the stage to a predetermined imaging position on the low-speed movement mode, the instantaneous image information at the predetermined imaging position.

2. The image measurement system according to claim 1, further comprising
an illuminator that irradiates the measurement object with strobe light, wherein the imaging controller executes stroboscopic imaging on the measurement object so as to capture the instantaneous image information.

3. The image measurement system according to claim 1, wherein
the movement controller switches to the low-speed movement mode from the high-speed movement mode by decreasing a relative speed and switches to the high-speed movement mode from the low-speed movement mode by increasing the relative speed.

4. The image measurement system according to claim 1, wherein
the imaging controller captures the instantaneous image information at the same time as the relative position of the camera with respect to the stage becomes the predetermined imaging position.

5. The image measurement system according to claim 1, wherein
the movement controller is capable of relatively stopping the camera with respect to the stage at the predetermined imaging position, and
the imaging controller captures the instantaneous image information at the same time as control to relatively stop the camera is relatively stopped with respect to the stage is performed.

6. The image measurement system according to claim 5, wherein
the imaging controller captures the instantaneous image information without waiting for the camera to be relatively stationary with respect to the placement portion after the control to relatively stop the camera with respect to the stage is performed.

7. The image measurement system according to claim 1, wherein the processor further controls a determining unit that determines whether or not the camera is relatively stationary with respect to the stage at the predetermined imaging position, wherein
the imaging controller captures the instantaneous image information in a case where the determination unit determines that the camera is relatively stationary with respect to the stage.

8. The image measurement system according to claim 7, wherein
the determination unit determines whether or not the camera is relatively stationary with respect to the stage on a basis of a change in the relative position of the camera with respect to the stage in a predetermined determination time duration, and
the predetermined determination time duration is set on a basis of a capturing time duration at a time of capturing the instantaneous image information.

9. The image measurement system according to claim 8, wherein
in a case where the capturing time duration at the time of capturing the instantaneous image information is a first time duration, the determination time duration is set as a second time duration, and in a case where the capturing time duration at the time of capturing the instantaneous image information is a third time duration larger than the first time duration, the determination time duration is set as a fourth time duration larger than the second time duration.

10. The image measurement system according to claim 8, further comprising
a scale that detects the relative position of the camera with respect to the stage, wherein the determination unit determines that the camera is relatively stationary with respect to the stage in a case where a value detected by the scale in the predetermined determination time duration is within a predetermined range.

11. The image measurement system according to claim 1, wherein the movement controller switches to the high-speed movement mode after capturing the instantaneous image information.

12. The image measurement system according to claim 1, wherein the imaging controller captures the instantaneous image information multiple times.

13. The image measurement system according to claim 12, wherein the imaging controller captures the instantaneous image information multiple times until it is determined that the instantaneous image information is capable of being used as an observation image.

14. The image measurement system according to claim 1, wherein the imaging controller controls a shutter speed of the camera so as to capture the instantaneous image information.

15. The image measurement system according to claim 1, further comprising an illuminator capable of irradiating the measurement object with strobe light and also capable of irradiating the measurement object with illumination light continuously for a predetermined period, wherein the imaging controller switches between a first imaging mode to capture the instantaneous image information by executing stroboscopic imaging on the measurement object and a second imaging mode to capture image information at a predetermined frame rate in a state in which the illumination unit irradiates the measurement object with the illumination light continuously for the predetermined period and executes the first imaging mode or the second imaging mode.

16. The image measurement system according to claim 15, wherein the imaging controller switches to the second imaging mode and executes the second imaging mode at the end of capturing the instantaneous image information on the first imaging mode.

17. The image measurement system according to claim 1, wherein an average speed of a relative movement speed of the camera with respect to the stage within the first movement range is lower than an average speed of a relative movement speed of the camera with respect to the stage within the second movement range.

18. The image measurement system according to claim 1, wherein a maximum speed of a relative movement speed of the camera with respect to the stage within the first movement range is lower than a maximum speed of a relative movement speed of the camera with respect to the stage within the second movement range.

19. An image measurement method, comprising the steps of:

providing camera;

providing a stage on which a measurement object is placed;

switching between a high-speed movement mode and a low-speed movement mode and relatively moving the camera with respect to the stage on which a measurement object is placed; and capturing instantaneous image information by the camera, wherein relatively moving the camera includes relatively moving the camera with respect to the stage on the low-speed movement mode within a first movement range in which a relative position of the camera with respect to the stage includes a predetermined imaging position and relatively moving the camera with respect to the placement portion on the high-speed movement mode within a second movement range outside the first movement range, and capturing the instantaneous image information includes capturing, after moving the relative position of the camera with respect to the stage to the predetermined imaging position on the low-speed movement mode, the instantaneous image information at the predetermined imaging position.

\* \* \* \* \*